(12) United States Patent
Zhou et al.

(10) Patent No.: US 12,477,047 B1
(45) Date of Patent: Nov. 18, 2025

(54) METHOD FOR AUTOMATED NAVIGATION OF COMPLEX WEBSITES

(71) Applicant: Intuit Inc., Mountain View, CA (US)

(72) Inventors: Yi Qun Zhou, Palo Alto, CA (US); Aparna Dhanasri Jayaprakash, Union City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/261,226

(22) Filed: Jul. 7, 2025

(51) Int. Cl.
*H04L 67/63* (2022.01)
*H04L 67/02* (2022.01)

(52) U.S. Cl.
CPC .............. *H04L 67/63* (2022.05); *H04L 67/02* (2013.01)

(58) Field of Classification Search
None
See application file for complete search history.

(56) References Cited

U.S. PATENT DOCUMENTS

| | | | |
|---|---|---|---|
| 10,037,546 B1 * | 7/2018 | Benisch | G06Q 30/0246 |
| 10,425,492 B2 * | 9/2019 | Comstock | H04L 67/535 |
| 2014/0278864 A1 * | 9/2014 | Stanislaw | G06Q 30/0246 |
| | | | 705/14.45 |
| 2018/0027085 A1 * | 1/2018 | Stanislaw | H04L 67/535 |
| | | | 709/224 |
| 2024/0062266 A1 * | 2/2024 | Yee | G06Q 30/0629 |

\* cited by examiner

*Primary Examiner* — Quang N Nguyen
(74) *Attorney, Agent, or Firm* — Lathrop GPM LLP (57) ABSTRACT

A method including receiving, via a network interface, a request from a user device of a user to access a complex website including first and second web pages for viewing by first and second user types, respectively. The user is associated with multiple identifiers of the online service. A known identifier for the user is determined from the request and the identifiers. A network access pathway is determined. A highest priority identifier is identified from among the identifiers by comparing the known identifier to a master schema data structure to select the highest priority identifier. A selected web page is selected from among the first web page and the second web page using the master schema data structure. The method also includes transmitting, via the network interface, Computer executable code is transmitted via the network interface to the user device to render the selected web page.

20 Claims, 5 Drawing Sheets

| AuthID | RealmID | IVID | Pathway | Website |
|---|---|---|---|---|
| Null | Null | 203945 | Traditional | Website A |
| Null | Null | 204567 | Traditional | Website B |
| Null | Null | 204568 | Traditional | Website C |
| | | | | |
| 256 | Null | 102934 | Traditional | Website A |
| 256 | Null | 506962 | DualLogin | Website A |
| 256 | Null | 506962 | Wayfare | Website C |
| | | | | |
| 506 | Null | 506962 | DualLogin | Website C |
| 506 | 12345 | 506962 | Traditional | Website B |
| 506 | 898989 | 506962 | Wayfare | Website A |
| | | | | |
| 256 | Null | 2342345 | DualLogin | Website B |
| 256 | 123 | 125124 | Traditional | Website A |
| 256 | 123 | 1234124 | Wayfare | Website C |

METHOD FOR AUTOMATED NAVIGATION OF COMPLEX WEBSITES

BACKGROUND

Complex websites are commonly found when browsing the Internet. A complex website is a website with at least two more web pages, however, in practice complex websites may have hundreds of related web pages. A large company may host thousands, or even tens of thousands of web pages, or more, as part of an overall complex website.

Navigating a complex website may be a problem for both users and automated computing systems attempting to obtain publicly available data from complex websites. In some cases, the website owner may wish certain users to visit one version of a web page and different users to visit another version of a web page, even though both web pages in general relate to the same subject matter.

The problem may be further complicated when users may be assigned multiple identifiers ("IDs") useable to access the complex website. For example, a user may have a user ID associated with the user's personal account, another use ID associated with the user's business account, a user ID assigned by the website owner and used to track the user, or other IDs. Further complication is added when the user's ID is not known when the user accesses the website, such as when the user device accesses the website by clicking on a link that refers the user to the website.

Thus, a technical problem is presented. The technical problem is how to determine, automatically by the server hosting the website, which web page should be presented to a user device when multiple user IDs could be present and the different web pages may be intended for viewing by different users.

SUMMARY

One or more embodiments provide for a method. The method includes receiving, via a network interface, a request from a user device of a user to access a complex website of an online service. The complex website includes a number of different web pages. The number of different web pages include a first web page for viewing by a first user type and a second web page for viewing by a second user type. The user is associated with a number of identifiers of the online service. The method also includes determining, from the request and from among the number of identifiers, a known identifier for the user. The method also includes determining a network access pathway, from among a number of network access pathways, by which the user device accessed the complex website. The method also includes identifying a highest priority identifier from among the number of identifiers by comparing the known identifier to a master schema data structure to select the highest priority identifier. The method also includes selecting, using the master schema data structure, a selected web page from among the first web page and the second web page. The method also includes transmitting, via the network interface, computer executable code via the network interface to the user device. The computer executable code is executable to render the selected web page on a display device the user device.

One or more embodiments also provide for a system. The system includes a computer processor executing an online service. The system also includes a data repository in communication with the computer processor. The data repository stores a complex website including a number of different web pages including a first web page for viewing by a first user type and a second web page for viewing by a second user type. The data repository also stores a request from a user device to access the complex website. The data repository also stores a number of identifiers of the online service, the number of identifiers associated with a user of the online service and including a known identifier and a highest priority identifier. The data repository also stores a master schema data structure storing information regarding the number of identifiers, a number of network access pathways including a network access pathway by which the user device accessed the complex website, the first web page, and the second web page. The data repository also stores computer executable code executable to render a selected web page, selected from among the first web page and the second web page, on a display device the user device. The system also includes a network interface in communication with the computer processor and the user device. The network interface is configured to receive the request from the user device of the user to access the complex website of the online service. The network interface is also configured to transmit the computer executable code to the user device. The system also includes a server controller executable by the computer processor to determine, from the request and from among the number of identifiers, the known identifier. The server controller is also executable to determine the network access pathway from among the number of network access pathways. The server controller is also executable to identify the highest priority identifier from among the number of identifiers by comparing the known identifier to the master schema data structure to select the highest priority identifier. The server controller is also executable to select, using the master schema data structure, the selected web page.

One or more embodiments provide for another method. The method includes receiving, via a network interface, a request from a user device of a user to access a complex website of an online service. The complex website includes a number of different web pages. The number of different web pages include a first web page for viewing by a first user type and a second web page for viewing by a second user type. The user is associated with a number of identifiers of the online service. The method also includes determining, from the request and from among the number of identifiers, a known identifier for the user. The method also includes determining a network access pathway, from among a number of network access pathways, by which the user device accessed the complex website. The method also includes identifying a highest priority identifier from among the number of identifiers by comparing the known identifier to a master schema data structure to select the highest priority identifier. The master schema data structure identifies the number of identifiers, the number of network access pathways, the first web page, and the second web page. The method also includes selecting, using the master schema data structure, a selected web page from among the first web page and the second web page. Selecting is performed by comparing the highest priority identifier and the network access pathway to the master schema data structure to identify the selected web page. The master schema data structure is used to determine the user as being one of the first user type and the second user type to identify a determined user type. Selecting includes selecting the selected web page according to the determined user type. The method also includes transmitting, via the network interface, computer executable code via the network interface to the user device. The computer executable code is executable to render the selected web page on a display device the user device.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments present one or more technical solutions to the technical problem of how to determine, automatically by the server hosting the website, which web page should be presented to a user device when multiple user IDs could be present and the different web pages may be intended for viewing by different users. In other words, the technical problem addressed by one or more embodiments relates to how to direct network traffic arriving at a complex website to the appropriate web pages.

Briefly, the technical solution involves determining a highest level user ID for the user device accessing the complex website and determining an access path that the user device used to reach the complex website. The combined information is compared to a master schema data structure that contains information describing how to route user device requests to access a website. Thus, the master schema data structure is used to select a selected web page from among multiple versions of a web page that the user device is attempting to access. The server controller (the software that controls how the complex website is presented to the user) then transmits to the user device computer executable code (e.g., hypertext markup language (HTML) code) for rendering the selected website on the user's device.

In this manner, the website owner may route a user to a version of the requested web page that is most useful for the particular user to receive, despite the technical challenges faced by the website owner to be able to route the user to the correct web page version. Accordingly, one or more embodiments provide a solution to the technical problem described above.

Figure 1:
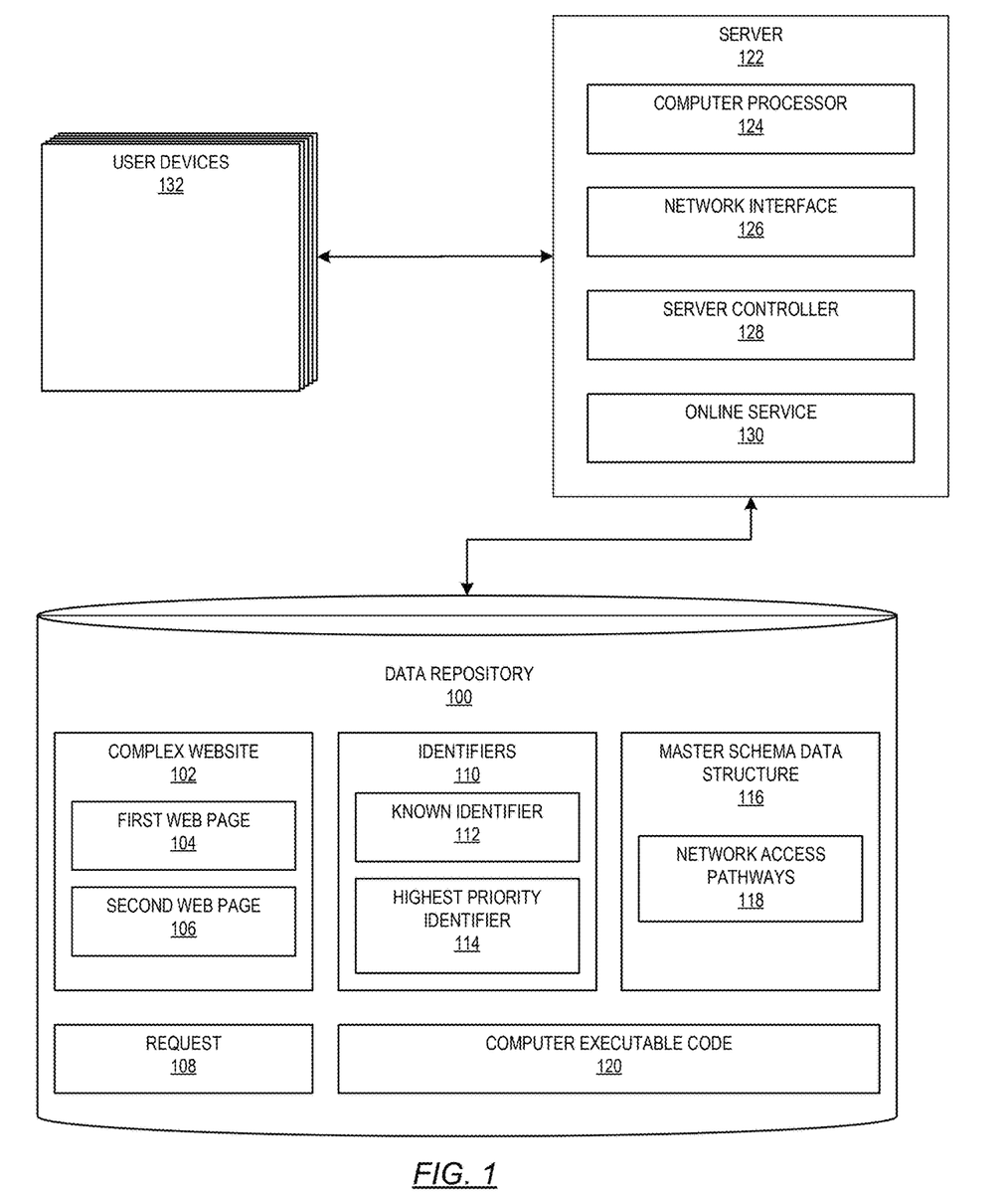
FIG. 1 shows a computing system for automated navigation of complex websites, in accordance with one or more embodiments.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a complex website (102). In the broadest sense, the complex website (102) is a website that has two or more web pages. However, in a practical sense, the complex website (102) is a website that may have many web pages, possibly hundreds, thousands, tens of thousands, or more. Nevertheless, the complex website (102) is complex at least insomuch as it may be initially unknown to the server (122) which web page on the complex website (102) should be presented to a particular user devices (132), particularly because multiple identifiers are associated with the complex website (102).

Each web page is stored as computer executable code which, when transmitted to a user device (e.g., the user devices (132) described below), may be rendered on the user device. The computer executable code may be, for example, hypertext transfer protocol (HTTP) code, though web pages could be stored in other computer languages.

Furthermore, the complex website (102) is associated with multiple identifiers (i.e., the identifiers (110), described below). In other words, the complex website (102) may be accessed by a user device that has multiple identities associated with the complex website (102).

Because the complex website (102) is complex, the complex website (102) has at least a first web page (104) and a second web page (106). Each of the complex website (102) and the second web page (106) are also web pages, as defined above. In one or more embodiments, the first web page (104) and the second web page (106) may be similar to each other, but intended for viewing by different types of users. For example, an advanced or sophisticated user of an application may be presented with the first web page (104), but a novice user may be presented with the second web page (106). Both web pages relate information or controls regarding the application, but the content of the web pages may be different.

The data repository (100) also stores a request (108). The request (108) is a computer readable command received from a user device (e.g., the user devices (132)) to access the complex website (102). The request may be, for example, a universal resource link (URL) request submitted to the website by way of the user clicking on a link, a login request for the user device to access the complex website (102), or a wayfare request. A wayfare request is a request received from within the complex website (102), such as when the user device has already logged into the complex website (102) and an application within the complex website (102) requests that one of the first web page (104) and the second web page (106) should be presented to the user device.

The data repository (100) also stores multiple identifiers (110). The identifiers (110) are sets of alphanumeric text that identify a user or a user device. Each identifier identifies one user or user device. However, users and user devices may have multiple identifiers. Thus, for example, a user may have a personal user identifier, a business user identifier, and an internal user identifier that the server controller (128) (defined below) assigns to the user device that logged into or accessed the complex website (102).

The known identifier (112) is an identifier that the server controller (128) knows is associated with a particular user or user device. For example, if a user logs into the complex website (102), then the login required the user to enter the user name, which is in the example the known identifier (112). However, one or more embodiments contemplate that the known identifier (112) may not be initially known, such as when the user accesses the complex website (102) via a link without logging into the website. Nevertheless, if no identifier is known initially by the server controller (128), then the server controller (128) may assign an identifier to the network access by the user device. In this case, the known identifier (112) may be the assigned identifier.

The identifiers (110) also include a highest priority identifier (114). Because a user or user device may be associated with multiple identifiers, one of the multiple identifiers is assigned a highest priority identifier (114). The highest priority identifier (114) is one of the identifiers (110) that has, with respect to the complex website (102), the server controller (128), or the online service (130), the highest assigned priority. For example, the highest priority identifier (114) may be the known identifier (112) in some embodiments; however, in other embodiments, the highest priority identifier (114) may be an internal identifier assigned by the server controller (128) to the user or user device. Thus, the one of the identifiers (110) that is assigned the highest priority identifier (114) depends on the specific implementation of one or more embodiments, but one or more embodiments each contemplate that at least one of the identifiers (110) is assigned to be the highest priority identifier (114).

The data repository (100) also stores a master schema data structure (116). The master schema data structure (116) is a data structure that stores computer readable data. The master schema data structure (116) may be, in some embodiments, a matrix, but may be a relational database, a graph database, etc. The master schema data structure (116) stores information related to the complex website (102), the identifiers (110), and other information, as described below. In particular, the master schema data structure (116) may store the identifiers (110), network access pathways (118) (defined below), the complex website (102) (including the first web page (104) and the second web page (106)), as well as other information related to the complex website (102).

Figure 2:
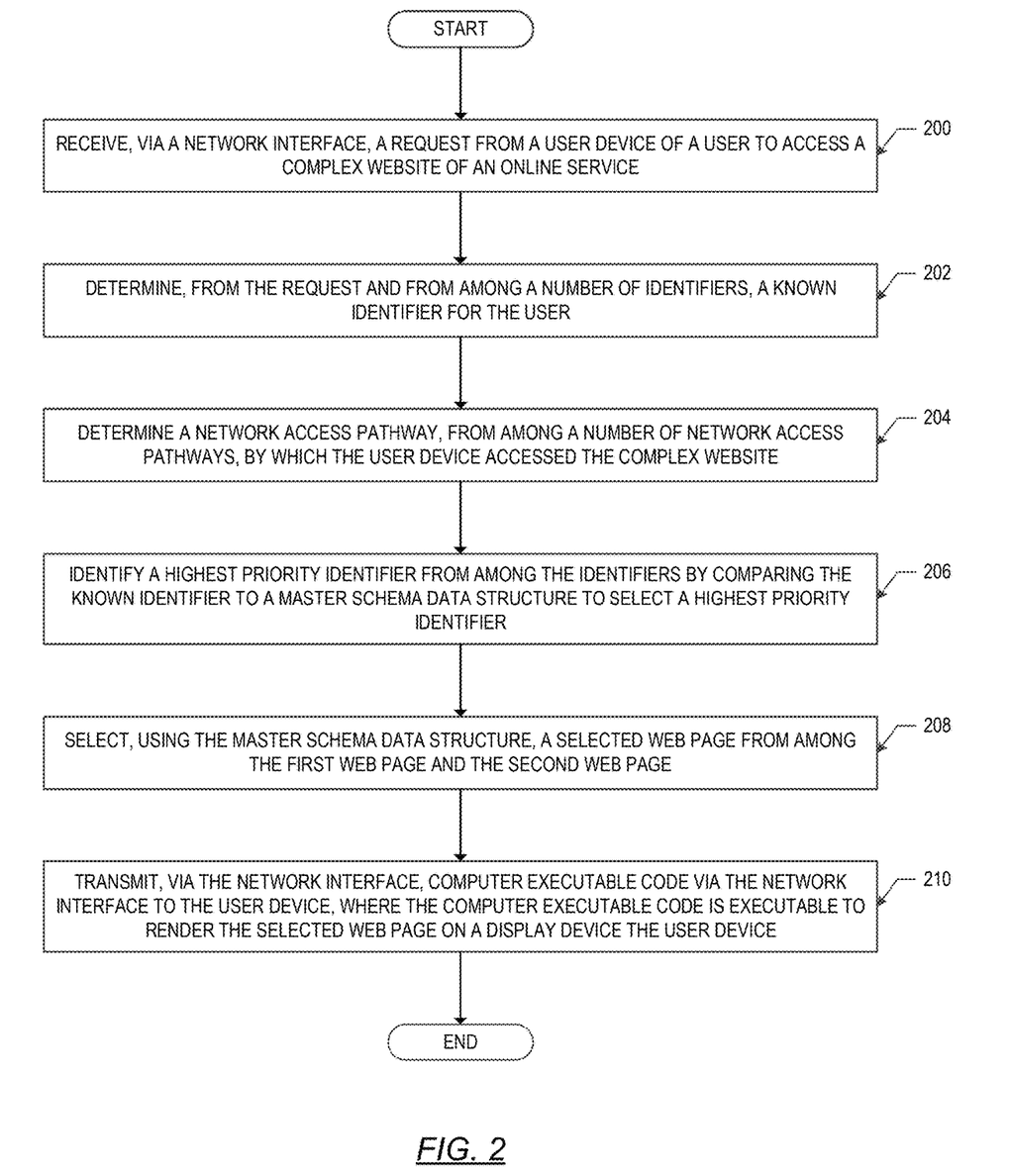
FIG. 2 shows a flowchart of a method for automated navigation of complex websites, in accordance with one or more embodiments.
Figure 4:
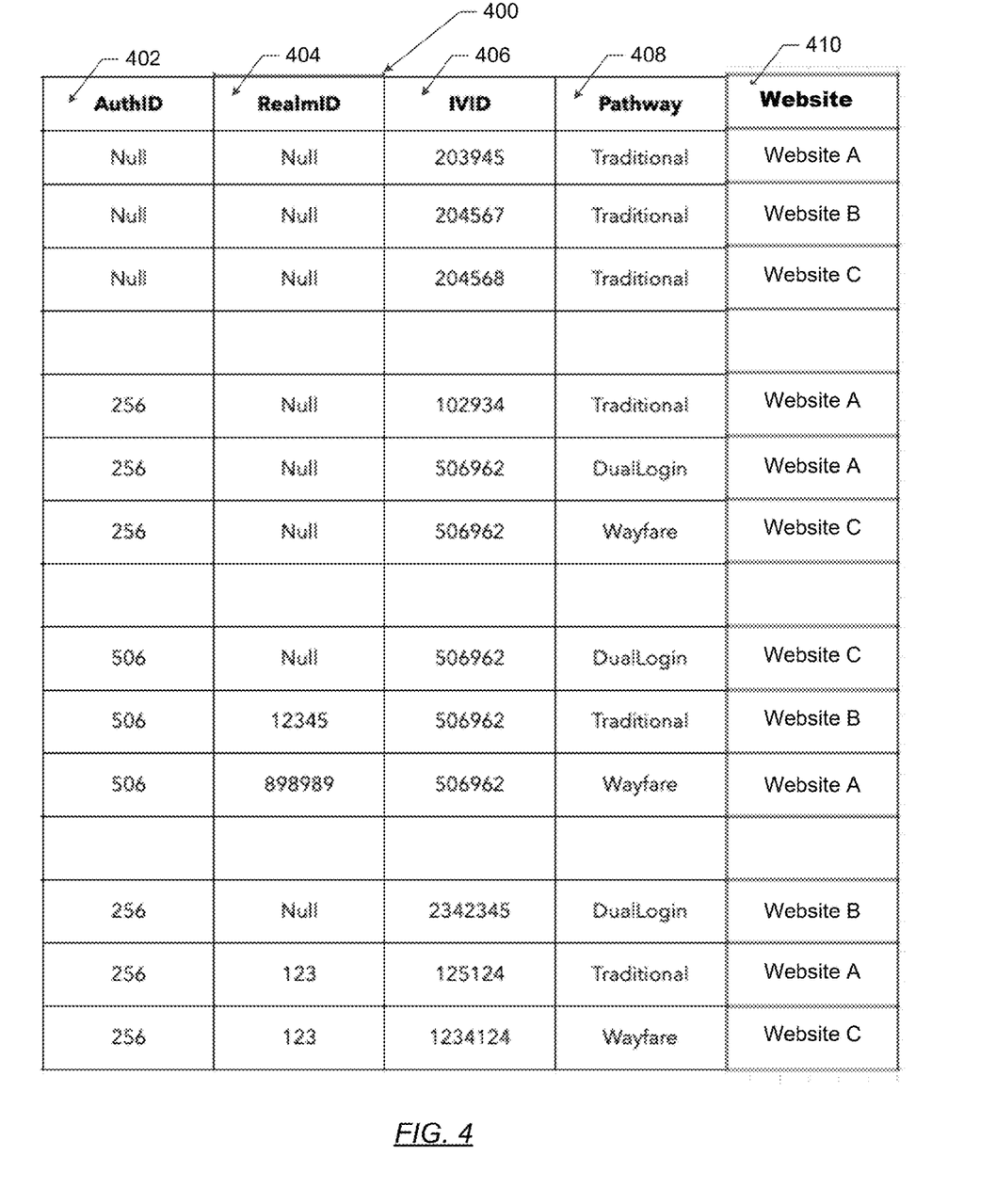
FIG. 4 shows an example of a master schema data structure for use in automated navigation of complex websites, in accordance with one or more embodiments.

Use of the master schema data structure (116) is described with respect to FIG. 2. An example of the master schema data structure (116) is shown in FIG. 4.

The master schema data structure (116) may store, as indicated above, one or more network access pathways (118). The network access pathways (118) are the pathways over a network by which the user devices (132) may access the complex website (102).

At least different network access pathways (118) are contemplated, though not all need be present for a given complex website (102). The network access pathways (118) may be a link which a user selected to access the complex website (102), a login the user provides in order to log into the complex website (102), or a wayfare access. The wayfare access occurs when a function called on one of the web pages in the complex website (102) refers the user to another web page within the complex website (102). Note that the wayfare access may occur with, or without, the known identifier (112), depending on whether the user initially logged into the complex website (102) or the user used a link to access the complex website (102) and is referred to another web page while browsing the complex website (102). However, other network access pathways are contemplated.

The data repository (100) also stores computer executable code (120). The computer executable code (120) is code, executable by the server (122) or by the user devices (132), which may be used to render the web pages on the complex website (102). An example of the computer executable code (120) is HTML code. However, other code could be used, such as cascading style sheets (CSS), JavaScript, extensible markup language (XML) code, or others.

The system shown in FIG. 1 may include other components. For example, the system shown in FIG. 1 also may include a server (122). The server (122) is one or more computer processors, data repositories, communication devices, and supporting hardware and software. The server (122) may be in a distributed computing environment. The server (122) is configured to execute one or more applications, such as the server controller (128) or the online service (130). The server (122) also may control the network interface (126), defined below. An example of a computer system and network that may form the server (122) is described with respect to FIG. 5A and FIG. 5B.

The server (122) includes a computer processor (124). The computer processor (124) is one or more hardware or virtual processors which may execute computer readable program code that defines one or more applications, such as the server controller (128) or the online service (130). The computer processor (124) also may control the network interface (126), defined below. An example of the computer processor (124) is described with respect to the computer processor(s) (502) of FIG. 5A.

The server (122) also includes a network interface (126). The network interface (126) is physical hardware, combined with software (e.g., drivers, etc.) that permit the server (122) to communicate with the user devices (132) or the data repository (100). Examples of the network interface (126) may be the communication interface (512) or the network (520) described with respect to FIG. 5A and FIG. 5B.

The server (122) also may include a server controller (128). The server controller (128) is software or application specific hardware which, when executed by the computer processor (124), controls and coordinates operation of the software or application specific hardware described herein. The server (122) may execute the method of FIG. 2. The server controller (128) also may control and coordinate execution of the network interface (126), the server controller (128), and the online service (130).

The server (122) also may include an online service (130). The online service (130) is one or more applications or computer executed functions offered via the server (122). The online service (130) may be an enterprise system. The online service (130) may include, or be constituted by, the complex website (102). An example of an online service (130) is a software application whose graphical user interface is presented as web pages via the complex website (102), but whose functions are executed by the server (122).

The system shown in FIG. 1 also may include one or more user devices (132). The user devices (132) are computing systems (e.g., the computing system (500) shown in FIG. 5A) that communicate with the server (122).

The user devices (132) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1. In one or more embodiments, it is contemplated that the user devices (132) include at least some remote user devices that access the complex website (102).

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for automated navigation of complex websites, in accordance with one or more embodiments. The method of FIG. 2 may be implemented using the system of FIG. 1 and one or more of the steps may be performed on or received at one or more computer processors.

Step 200 includes receiving, via a network interface, a request from a user device of a user to access a complex website of an online service. The request may be received over an internet connection, or other network connection.

The complex website includes a number of different web pages. The number of different web pages include a first web page for viewing by a first user type and a second web page for viewing by a second user type. The user is associated with a number of identifiers of the online service, Step 202 includes determining, from the request and from among the number of identifiers, a known identifier for the user. Determining may be performed by a number of different techniques. In an embodiment, the known identifier may be determined by referring to the identifier provided by a user device when accessing the complex website. In another embodiment, the known identifier may be determined by the server controller assigning the user device accessing the website an identifier based on an internet protocol (IP) address of the user device accessing the complex website. In still another embodiment, the known identifier may be determined when a user activates a wayfare link within the complex website, in which case a prior user identifier provided by the user may be used. Other methods for determining the known identifier exist, such as for example when the user provides a new user identifier or an additional user identifier.

Step 204 includes determining a network access pathway, from among a number of network access pathways, by which the user device accessed the complex website. Determining the network access pathway may be performed by different techniques, depending on the nature of the network access pathway. For example, if the user device accesses the complex website by way of a link, then the network access pathway is a link access, sometimes referred to as a traditional pathway into the complex website. In another example, the network access pathway may be determined to be an identifier pathway when a user provides a username (i.e., a known identifier) when accessing the complex website. In still another example, the network access pathway may be determined at a time that the user activates a wayfare access which may lead to one of several different web pages. In the latter case, the server controller may consult a master schema data structure or other memory to reference a login or link provided earlier when the user first accessed the complex website. Other methods for determining the network access pathway exist.

Step 206 includes identifying a highest priority identifier from among the number of identifiers by comparing the known identifier to a master schema data structure to select the highest priority identifier. The master schema data structure identifies the number of identifiers, the number of network access pathways, the first web page, and the second web page, as the master schema data structure stores that information. Thus, when the known identifier is compared to the master schema data structure, then the highest priority identifier associated with the known identifier may be selected by reference to the entry for the highest priority identifier stored in the master schema data structure.

The known identifier may be, in some cases, the highest priority identifier. However, in other embodiments, the known identifier may be associated with a different identifier that is assigned, in the master schema data structure, to be the highest priority identifier.

Using the highest priority identifier helps the server controller disambiguate users, and therefore route the user device to the proper or best web page among multiple possible web pages. For example, an advanced user may use a link to access the complex website. However, as described above, the information contained in the link (e.g., the user device's IP address) may be used to identify an internal identifier for the user. The internal identifier may be the highest priority identifier because the internal identifier indicates the level of sophistication of the user. Thus, the user may be routed to a website for experienced users or a website for novice users, as appropriate for that user, even though the user only clicked on a link to access the complex website.

Step 208 includes selecting, using the master schema data structure, a selected web page from among the first web page and the second web page. Selecting may be performed by comparing the highest priority identifier and the network access pathway to the master schema data structure to identify the selected web page.

For example, if the user's highest priority identifier indicates that the user is an advanced user, and if the user has already logged into the complex website (i.e., a wayfare network access pathway), then the user may be logged into the user's custom graphical user interface by way of a user's stored web page. However, if the user's highest priority identifier indicates that the user is a novice user, and the user accessed the complex website via a link (i.e., a traditional pathway), then the user may be routed to a welcome website that helps the user navigate the initial steps of using the complex website.

In either case, the master schema data structure contains the reference information that permits the user controller to determine the web page to which the user or user device should be routed. For example, a given combination of the highest priority identifier and the network access pathway may be referenced in the master schema data structure, and the specific website in the complex website is associated with that combination in the master schema data structure. Thus, the master schema data structure permits appropriate selection of the particular website that should be displayed to the user or user device.

In an embodiment, the master schema data structure may be used to determine the user as being one of a first user type and a second user type to identify a determined user type. The user type classifies the user (e.g., a novice user, an advanced user, an existing user, a paid user, etc.). In this case, selecting may include selecting the selected web page according to the determined user type.

In another embodiment, the method also may include identifying, using the highest priority identifier, a previous network access pathway used by the user to access the complex website. In this case, electing further may include selecting the selected web page using the previous network access pathway, rather than a current network access pathway.

In yet another embodiment, the request may include a successful login to the complex website. In this case, the network access pathway is the successful login and the known identifier includes a current login identifier used in the successful login. In this case, the method may include identifying, from the master schema data structure and the current login identifier, a user profile for the user. Selecting the selected web page then further includes selecting the selected web page using the user profile.

In still another embodiment, the user device may have previously logged into the complex website. In this case, the network access pathway is a post-authentication access attempt. The known identifier includes a past login identifier used to log in to the complex website. The user device was granted access to an application of the complex website. The request includes a call from the application to determine whether to navigate the user device to one of the first web page and the second web page. In this case, selecting further includes selecting according to an identity of the application.

In a yet different embodiment, the request may be generated from a link selected by the user device and transmitted to the complex website. In this case, the known identifier may include a code embedded in the link. The network access pathway may include a non-login request to access the website. In this case, selecting the selected web page may further include selecting the selected web page according to the code embedded in the link. Still other variations are possible.

Step 210 includes transmitting, via the network interface, computer executable code via the network interface to the user device. The computer executable code is executable to render the selected web page on a display device of the user device. The computer executable code may be stored in a data repository. Then, when the selected web page is identified, the computer executable code corresponding to the selected web page web page may be transmitted over the network to the user device. The code may be executed at the user device to display to the user the selected web page.

While the various steps in the flowchart of FIG. 2 are presented and described sequentially, at least some of the steps may be executed in different orders, may be combined, or omitted, and at least some of the steps may be executed in parallel. Furthermore, the steps may be performed actively or passively.

Figure 3:
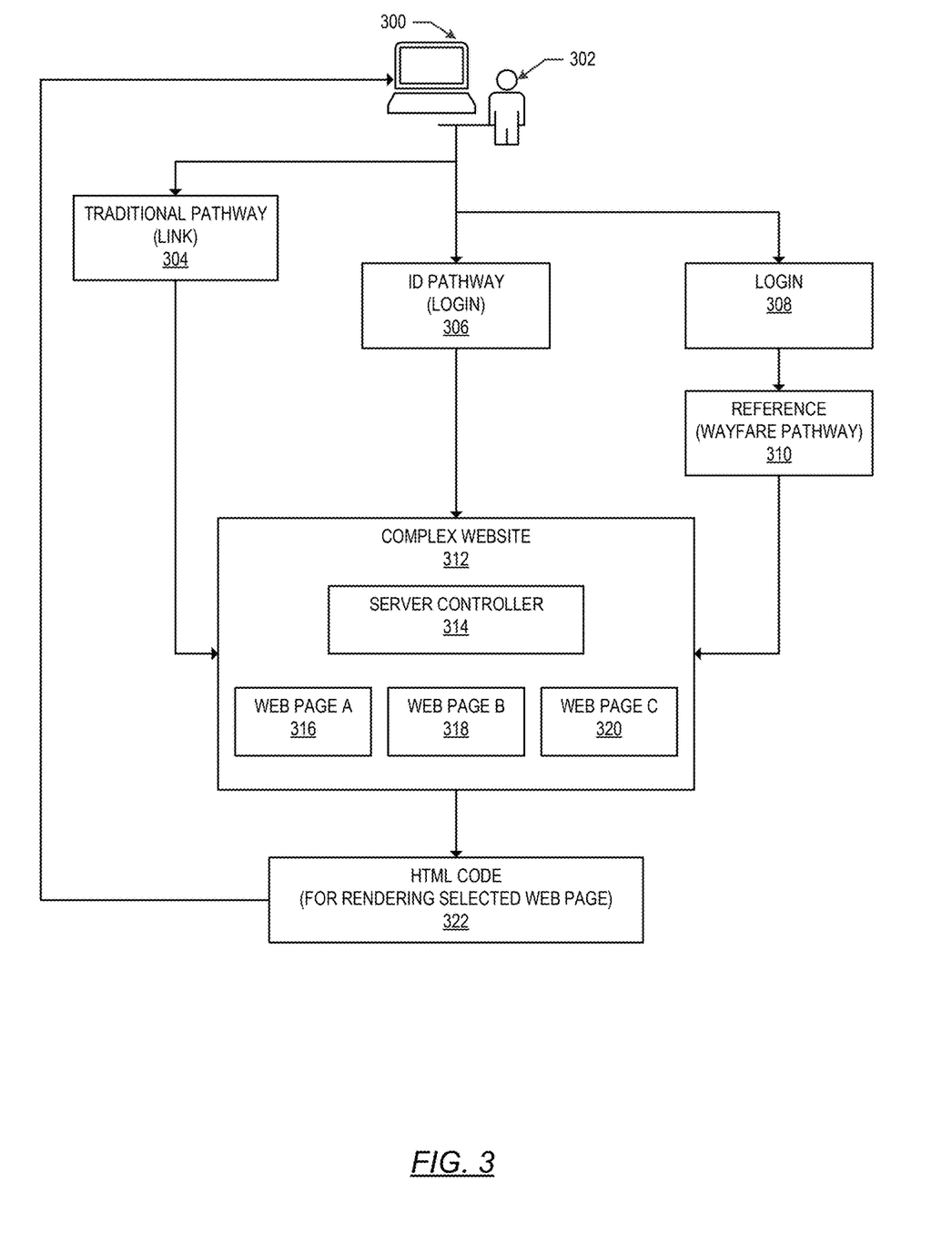
FIG. 3 shows an examples of automated navigation of complex websites, in accordance with one or more embodiments.

FIG. 3 shows an example of methods for automated navigation of complex websites, in accordance with one or more embodiments. The following example is for explanatory purposes only and not intended to limit the scope of one or more embodiments. FIG. 3 may be considered a variation of the method of FIG. 2. The methods described in FIG. 3 may be implemented using the system shown in FIG. 1.

In the example, a user device (300) accesses a complex website (312). A user (302) may use the user device (300) to browse the complex website (312).

The user device (300) has three network access pathways to access the complex website (312). The network access pathways include a traditional pathway (304), which uses a link to access the complex website (312). The network access pathways also include an ID pathway (306), which uses a login to access the complex website (312). The network access pathways also include a reference (310), which uses a wayfare to access the complex website (312) after the user has used a login (308) to access some other portion of the complex website (312).

In one example, the user clicks on a link, thereby using the traditional pathway (304). The method of FIG. 2 is executed. The server controller (314) determines, from the IP address in the link, that the user is associated with an internal ID, which is the highest priority ID. The user is determined to be a sophisticated user who has an existing account. Thus, the server controller (314) identifies, from a master schema data structure by referencing the highest priority ID and the pathway, that the user should be directed to web page A (316), which is a web page for sophisticated users. The user is prompted to enter the user's own username and password to access the application for which the user has paid to have access. Once the user does so, the server controller (314) transmits the HTML code (322) for rendering the selected web page, in this case web page A (316), to the user device (300) for rendering and displaying to the user.

In another example, the user enters login information including a username and password (i.e., the ID pathway (306)). The known user ID is used to determine a highest priority ID, which is the user's internal reference number assigned by the company owning the complex website (312). The combination of the ID pathway (306) and the highest priority ID are compared to the master schema data structure in order to determine that the user is an intermediate user who should be shown web page B (318). Thus, the server controller (314) transmits the HTML code (322) for rendering the selected web page, in this case web page B (318), to the user device (300) for rendering and displaying to the user.

In another example, the user has logged into the complex website (312) via login (308). The user is using an entirely different program, but is shown an advertisement for a new program available via the complex website (312). The user selects a widget that indicates the user's interest. Thus, the user is using the reference (310) network access pathway, which is a wayfare pathway. The user's highest priority identifier, an internal identifier assigned by the website, is used in conjunction with the master schema data structure to determine that the user is a novice user of the advertised software. The combination of the reference (310) and the user's highest priority identifier indicate, by reference to the master schema data structure, that the user should be shown web page C (320), which is a web page intended for review by novice users. Thus, the server controller (314) transmits the HTML code (322) for rendering the selected web page, in this case web page C (320), to the user device (300) for rendering and displaying to the user.

Other combinations are possible. For example, the highest priority identifier may be a login identifier, which may force a user to login if the user selected the traditional pathway (304). In another example, the highest priority identifier may, by reference to the master schema data structure, override presentation of one web page that is presented normally to existing users in favor of another web page that is presented to novice users (or sophisticated users). Still other combinations are possible.

FIG. 4 shows an example of a master schema data structure for use in automated navigation of complex websites, in accordance with one or more embodiments. In the example of FIG. 4, the master schema data structure (400) is a table data structure that stores three different identifiers, AuthID (402), RealmID (404), and IVID (406). The master schema data structure (400) also stores a network access pathway (408) by which the user accesses the complex website. The master schema data structure (400) also stores a website identity (410) that should be shown to a user that matches the combination of highest priority ID and pathway. In this manner, users may be routed to appropriate websites automatically on a complex website.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
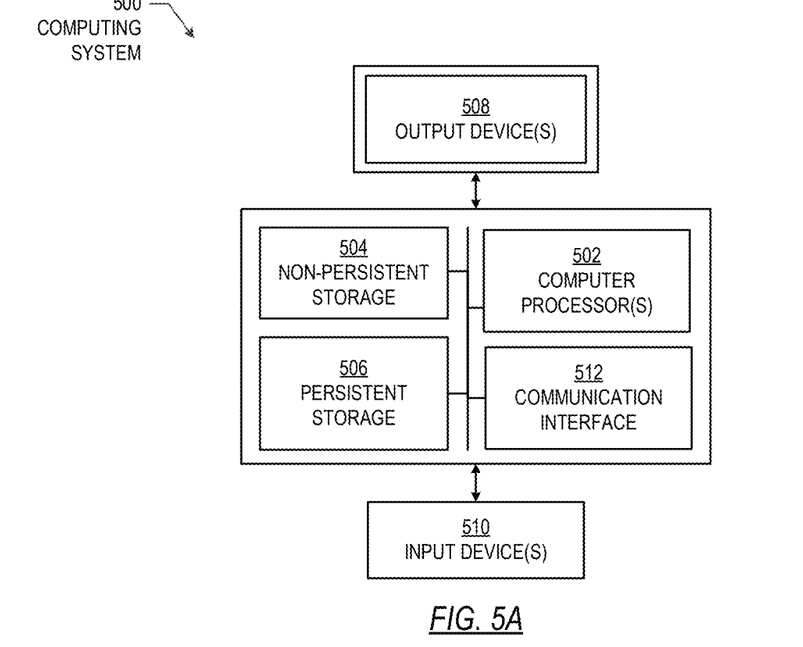
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
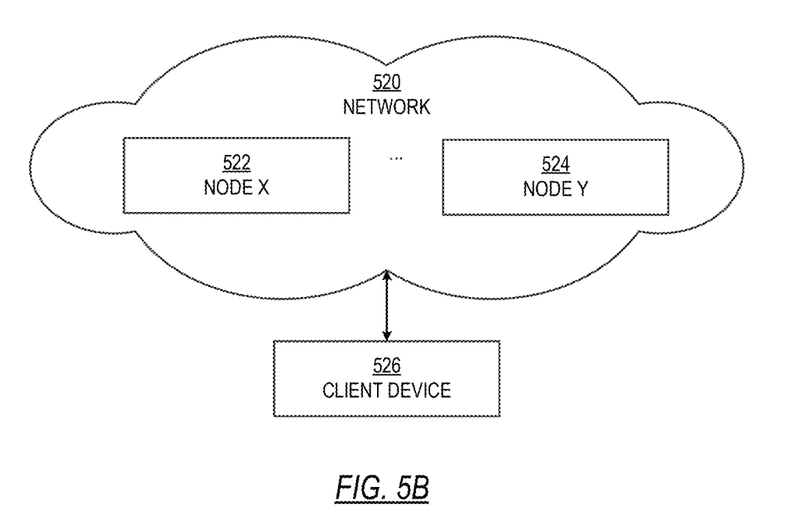

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    receiving, via a network interface, a request from a user device of a user to access a complex website of an online service, wherein:
        the complex website comprises a plurality of different web pages,
        the plurality of different web pages include a first web page for viewing by a first user type and a second web page for viewing by a second user type, and
        the user is associated with a plurality of identifiers of the online service;
    determining, from the request and from among the plurality of identifiers, a known identifier for the user;
    determining a network access pathway, from among a plurality of network access pathways, by which the user device accessed the complex website;
    identifying a highest priority identifier from among the plurality of identifiers by comparing the known identifier to a master schema data structure to select the highest priority identifier;
    selecting, using the master schema data structure, a selected web page from among the first web page and the second web page; and
    transmitting, via the network interface, computer executable code via the network interface to the user device, wherein the computer executable code is executable to render the selected web page on a display device the user device.

2. The method of claim 1, wherein the master schema data structure identifies the plurality of identifiers, the plurality of network access pathways, the first web page, and the second web page.

3. The method of claim 1, wherein selecting is performed by comparing the highest priority identifier and the network access pathway to the master schema data structure to identify the selected web page.

4. The method of claim 1, further comprising:
    identifying, using the highest priority identifier, a previous network access pathway used by the user to access the complex website,
    wherein selecting further comprises selecting using the previous network access pathway.

5. The method of claim 1, wherein:
    the request comprises a successful login to the complex website,
    the network access pathway comprises the successful login, and
    the known identifier comprises a current login identifier used in the successful login; and
    the method further comprises:
        identifying, from the master schema data structure and the current login identifier, a user profile for the user, wherein:
            selecting further comprises selecting using the user profile.

6. The method of claim 1, wherein:
    the user device previously logged into the complex website,
    the network access pathway comprises a post-authentication access attempt,
    the known identifier comprises a past login identifier used to log in to the complex website,
    the user device was granted access to an application of the complex website, and
    the request comprises a call from the application to determine whether to navigate the user device to one of the first web page and the second web page.

7. The method of claim 6, wherein selecting further comprises selecting according to an identity of the application.

8. The method of claim 1, wherein:
    the request is generated from a link selected by the user device and transmitted to the complex website,
    the known identifier comprises a code embedded in the link, and
    the network access pathway comprises a non-login request to access the website.

9. The method of claim 8, wherein selecting further comprises selecting according to the code embedded in the link.

10. The method of claim 1, wherein the master schema data structure is used to determine the user as being one of the first user type and the second user type to identify a determined user type, and wherein selecting comprises selecting the selected web page according to the determined user type.

11. A system comprising:
    a computer processor executing an online service;
    a data repository in communication with the computer processor and storing:
        a complex website comprising a plurality of different web pages including a first web page for viewing by a first user type and a second web page for viewing by a second user type,
        a request from a user device to access the complex website,
        a plurality of identifiers of the online service, the plurality of identifiers associated with a user of the online service and including a known identifier and a highest priority identifier,
        a master schema data structure storing information regarding the plurality of identifiers, a plurality of network access pathways including a network access pathway by which the user device accessed the complex website, the first web page, and the second web page, and
        computer executable code executable to render a selected web page, selected from among the first web page and the second web page, on a display device the user device;
    a network interface in communication with the computer processor and the user device, wherein the network interface is configured to:
        receive the request from the user device of the user to access the complex website of the online service, and
        transmit the computer executable code to the user device; and
    a server controller executable by the computer processor to:

determine, from the request and from among the plurality of identifiers, the known identifier,
determine the network access pathway from among the plurality of network access pathways,
identify the highest priority identifier from among the plurality of identifiers by comparing the known identifier to the master schema data structure to select the highest priority identifier, and
select, using the master schema data structure, the selected web page.

12. The system of claim 11, wherein the master schema data structure identifies the plurality of identifiers, the plurality of network access pathways, the first web page, and the second web page.

13. The system of claim 11, wherein selecting is performed by comparing the highest priority identifier and the network access pathway to the master schema data structure to identify the selected web page.

14. The system of claim 11, wherein the server controller is further executable to:
identify, using the highest priority identifier, a previous network access pathway used by the user to access the complex website,
wherein selecting further comprises selecting using the previous network access pathway.

15. The system of claim 11, wherein:
the request comprises a successful login to the complex website,
the network access pathway comprises the successful login,
the known identifier comprises a current login identifier used in the successful login, and
the server controller is further executable to:
identify, from the master schema data structure and the current login identifier, a user profile for the user, wherein:
selecting further comprises selecting using the user profile.

16. The system of claim 11, wherein:
the user device previously logged into the complex website,
the network access pathway comprises a post-authentication access attempt,
the known identifier comprises a past login identifier used to log in to the complex website,
the user device was granted access to an application of the complex website, and
the request comprises a call from the application to determine whether to navigate the user device to one of the first web page and the second web page.

17. The system of claim 16, wherein selecting further comprises selecting according to an identity of the application.

18. The system of claim 11, wherein:
the request is generated from a link selected by the user device and transmitted to the complex website,
the known identifier comprises a code embedded in the link,
the network access pathway comprises a non-login request to access the website, and
selecting further comprises selecting according to the code embedded in the link.

19. The system of claim 11, wherein the master schema data structure is used to determine the user as being one of the first user type and the second user type to identify a determined user type, and wherein selecting comprises selecting the selected web page according to the determined user type.

20. A method comprising:
receiving, via a network interface, a request from a user device of a user to access a complex website of an online service, wherein:
the complex website comprises a plurality of different web pages,
the plurality of different web pages include a first web page for viewing by a first user type and a second web page for viewing by a second user type, and
the user is associated with a plurality of identifiers of the online service,
determining, from the request and from among the plurality of identifiers, a known identifier for the user;
determining a network access pathway, from among a plurality of network access pathways, by which the user device accessed the complex website;
identifying a highest priority identifier from among the plurality of identifiers by comparing the known identifier to a master schema data structure to select the highest priority identifier, wherein the master schema data structure identifies the plurality of identifiers, the plurality of network access pathways, the first web page, and the second web page;
selecting, using the master schema data structure, a selected web page from among the first web page and the second web page, wherein:
selecting is performed by comparing the highest priority identifier and the network access pathway to the master schema data structure to identify the selected web page,
the master schema data structure is used to determine the user as being one of the first user type and the second user type to identify a determined user type, and
selecting comprises selecting the selected web page according to the determined user type; and
transmitting, via the network interface, computer executable code via the network interface to the user device, wherein the computer executable code is executable to render the selected web page on a display device the user device.

* * * * *